United States Patent
Irita

(10) Patent No.: US 8,157,370 B2
(45) Date of Patent: Apr. 17, 2012

(54) IMAGE RECORDING METHOD, INK SET, RECORDED MATERIAL

(75) Inventor: Kiyoshi Irita, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 473 days.

(21) Appl. No.: 12/394,531

(22) Filed: Feb. 27, 2009

(65) Prior Publication Data

US 2009/0233061 A1  Sep. 17, 2009

(30) Foreign Application Priority Data

Mar. 12, 2008  (JP) .................. 2008-062693

(51) Int. Cl.
*B41J 2/01* (2006.01)
*G01D 11/00* (2006.01)

(52) U.S. Cl. .............. 347/105; 347/101; 347/100

(58) Field of Classification Search .......... 347/100, 347/95, 96, 105, 102, 101; 428/195, 32.1
See application file for complete search history.

(56) References Cited

U.S. PATENT DOCUMENTS

| | | | |
|---|---|---|---|
| 6,126,281 A * | 10/2000 | Shimoda et al. | 347/102 |
| 6,140,390 A * | 10/2000 | Bugner et al. | 523/160 |
| 6,283,589 B1 | 9/2001 | Gelbart | |
| 6,550,909 B2 * | 4/2003 | Ichinose et al. | 347/105 |
| 7,632,562 B2 * | 12/2009 | Nair et al. | 428/195.1 |
| 2009/0053409 A1 * | 2/2009 | Yamamoto et al. | 428/32.18 |
| 2009/0130320 A1 * | 5/2009 | Kawakami et al. | 428/32.18 |

FOREIGN PATENT DOCUMENTS

| JP | 09-254376 A | 9/1997 |
|---|---|---|
| JP | 2004-136458 A | 5/2004 |

* cited by examiner

*Primary Examiner* — Manish S Shah
(74) *Attorney, Agent, or Firm* — Sughrue Mion, PLLC

(57) ABSTRACT

A method of recording an image by applying an aqueous ink by an inkjet method, including: forming a blocking layer on a recording medium, the blocking layer having a polymer component and being capable of blocking permeation of a solvent in the aqueous ink into the recording medium; forming a fixation layer on the blocking layer, the fixation layer having resin particles and a material that fixes a component in the aqueous ink; and recording an image by applying the aqueous ink onto the fixation layer by an inkjet method, the aqueous ink having a pigment, resin particles, water-soluble organic solvent and water, wherein the glass transition temperature of the polymer component in the blocking layer (Tgb), the glass transition temperature of the resin particles in the aqueous ink (Tgi) and the glass transition temperature of the resin particles in the fixation layer (Tgc) satisfy the relationship of Tgb<Tgi<Tgc.

8 Claims, 1 Drawing Sheet

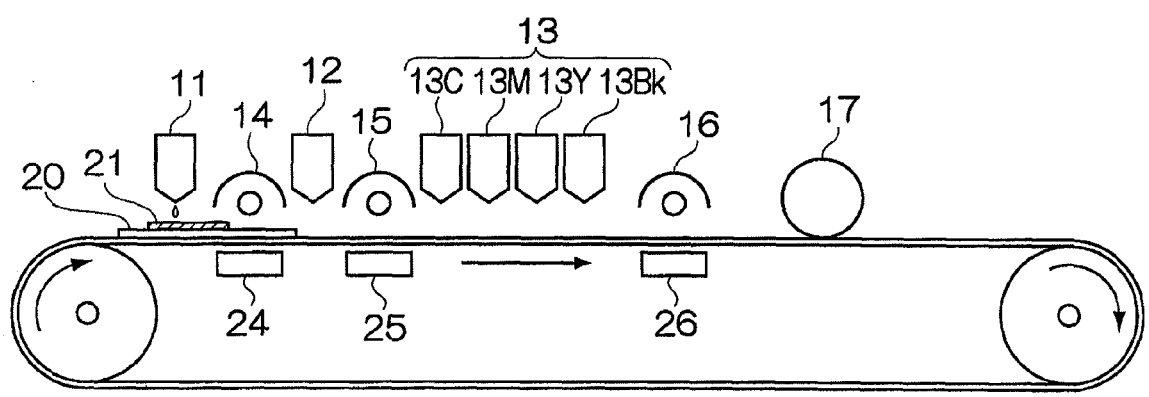

IMAGE RECORDING METHOD, INK SET, RECORDED MATERIAL

CROSS-REFERENCE TO RELATED APPLICATION

This application claims priority under 35 USC 119 from Japanese Patent Application No. 2008-062693, the disclosure of which is incorporated by reference herein.

BACKGROUND OF THE INVENTION

1. Field of the Invention

The present invention relates to an image recording method, an ink set, and a recorded material.

2. Description of the Related Art

In the field of recording media and inks for use in inkjet recording, various techniques have been proposed in order to form a high-quality image having improved color density, fixing properties and fineness.

However, since there are various kinds of recording media, including plain paper, there may be problems in that the quality of the recorded image in terms of fixing properties, fineness or the like may not be sufficiently achieved or curling of the recording medium may occur after the recording. For example, when recording is performed using an aqueous ink on a recording medium for use in an ordinary printing process, including "coated paper" such as art paper or coated paper or "non-coated paper" such as bookpaper, it is known that deformation of paper called curling may be caused by severance or reconnection of hydrogen bonds in cellulose fiber contained in the paper, due to the moisture contained in the aqueous ink.

On the other hand, as the inkjet recording speed increases, recording media are required to adapt to a single pass recording system, in which recording can be performed at high speed by a single operation of a recording head, rather than a shuttle-scan system. In the single pass system, the ink needs to be rapidly absorbed in the recording medium. However, when a large amount of ink is applied onto the recording medium upon formation of a solid image or the like, curling tends to occur since a large amount of solvent contained in the ink is absorbed in the recording medium.

Although some techniques have been proposed in order to suppress the curling of the recording medium, for example, by adding an anti-curling agent such as sugar to the ink, or by increasing the forth of a system in a delivery section at which the recording medium is restricted from moving, sufficient effects of suppressing curling have yet be achieved.

Japanese Patent Application Laid-Open (JP-A) No. 2004-136458 discloses a method of suppressing curling by applying a liquid containing alcohol to a recording medium prior to conducting recording with ink, and then recording an image to the recording medium using ink in such a manner that the recording medium is substantially dried at a recording position. However, according to this method, cissing of ink or bleeding in the image may be caused by the alcohol that has been applied to the recording medium before the application of the aqueous ink. If the surface of the recording medium after the alcohol-containing liquid has been applied is dried in order to overcome the above problem, curling caused upon application of ink in the subsequent step may not be prevented.

JP-A No. 9-254376 discloses an inkjet printing method in which a pretreatment liquid is applied to a recording medium in a separate step from that of ink, in order to suppress the penetration of ink in the recording medium. However, according to this method, while suppressing the penetration of a colorant (pigment) in the ink by insolubilizing the colorant by the action of a component such as a cationic active agent in the pretreatment composition, penetration of a solvent (water) in the ink that does not react with the pretreatment composition may not be suppressed. Consequently, curling of the recording medium cannot be suppressed.

U.S. Pat. No. 6,283,589 discloses a method in which a recording medium is made liquid-repellent prior to application of ink. However, according to this method, while suppressing the penetration of ink, the capillary action for a solvent in the ink may be reduced to suppress spreading of ink dots. Therefore, spaces may be formed between the ink dots to significantly reduce the optical density of the image and unevenness due to mislocation of ink dots may be exaggerated, thereby failing to obtain a high-quality image.

In view of the above-mentioned circumstances, the present invention provides an image recording method that can form an image with high anti-abrasion properties and high reproducibility while suppressing curling of the recording medium, an ink set for use in the above image recording method, and a recording material that is obtained in the above image recording method.

Specifically, the invention has been made based on the findings that when an image is formed by applying an aqueous ink onto a recording medium having thereon a blocking layer that blocks permeation of a solvent such as water or aqueous organic solvent and a fixation layer that fixes a component of the aqueous ink, in such a manner that the glass transition temperature of resin particles contained in the fixation layer (Tgc) (or a fixation composition) and the glass transition temperature of resin particles contained in the aqueous ink (Tgi) satisfy a specific relationship, formation of a high-quality image with less curling and improved anti-abrasion properties may be effectively achieved.

SUMMARY OF THE INVENTION

A first aspect of the invention provides a method of recording an image by applying an aqueous ink by an inkjet method, comprising:

forming a blocking layer on a recording medium, the blocking layer comprising a polymer component and being capable of blocking permeation of a solvent in the aqueous ink into the recording medium;

forming a fixation layer on the blocking layer, the fixation layer comprising resin particles and a material that fixes a component in the aqueous ink; and recording an image by applying the aqueous ink onto the fixation layer by an inkjet method, the aqueous ink comprising a pigment, resin particles, water-soluble organic solvent and water, wherein the glass transition temperature of the resin particles in the aqueous ink (Tgi) and the glass transition temperature of the resin particles in the fixation layer (Tgc) satisfy the relationship of $Tgi \leq Tgc$.

A second aspect of the invention provides an ink set comprising:

a blocking composition containing a polymer component and water, the composition being capable of forming a film that blocks permeation of water or water-soluble organic solvent;

an aqueous ink containing a pigment, resin particles, water-soluble organic solvent and water; and a fixation composition containing resin particles, water and a material capable of fixing a component in the aqueous ink, the composition being capable of forming a film, wherein the glass transition temperature of the resin particles in the aqueous ink (Tgi) and the glass transition temperature of the resin particles in the fixation composition (Tgc) satisfy the relation of Tgi≦Tgc.

BRIEF DESCRIPTION OF THE DRAWING

FIG. 1 is a schematic view of an exemplary structure of inkjet recording apparatus used in the image recording method of the invention.

DERAILED DESCRIPTION OF THE INVENTION

<Image Recording Method>

The image recording method of the invention is a method of recording an image on a recording medium with an aqueous ink by an inkjet method. Specifically, the method includes a blocking layer formation step of forming a blocking layer on a recording medium, the blocking layer containing a polymer component and being capable of blocking permeation of a solvent in the aqueous ink solvent into the recording medium; a fixation layer formation step of forming a fixation layer on the blocking layer, the fixation layer containing a material that fixes a component of the aqueous ink and resin particles; and an image recording step of ejecting an aqueous ink by an inkjet method on the fixation layer that has been formed on the blocking layer, the aqueous ink containing a pigment, resin particles, a water-soluble organic solvent and water, wherein the glass transition temperature of the resin particles contained in the fixation layer (Tgc; ° C.) and the glass transition temperature of the resin particles in the aqueous ink to be applied onto the fixation layer (Tgi; ° C.) satisfy the relationship of Tgi≦Tgc.

In the invention, the blocking layer capable of blocking permeation of a solvent contained in the aqueous ink (for example, water and water-soluble organic solvent) is formed on a recording medium prior to recording an image. When the blocking composition used for the formation of the blocking layer is applied onto the recording medium, it forms a film that blocks permeation of the ink solvent into the recording medium, thereby preventing curling of the recording medium. However, when the permeation of the ink solvent into the recording medium is blocked, solidification of the ink that has been applied onto the recording layer may be hindered and deposition interference or bleeding may be easily caused. However, by forming the fixation layer on the blocking layer and applying the ink onto the fixation layer, increase in the viscosity of the ink or aggregation of the ink component may occur to cause solidification of the ink, thereby enabling the formation of a high-quality image. In this regard, since the aqueous ink is fixed together with the ink solvent contained therein, there is a fear that the image thus formed may exhibit poor abrasion resistance. According to the invention, the fixation layer (fixation composition) contains resin particles (such as latex), and the glass transition temperature of the resin particles (Tgc) and the glass transition temperature of the resin particles contained in the aqueous ink (Tgi) satisfy the relationship of Tgi≦Tgc. Therefore, the blocking layer is formed prior to the film formation of the resin particles contained in the aqueous ink, and the blocking layer suppresses the permeation of the ink solvent into the recording medium to improve the abrasion resistance of the image. When Tgi and Tgc satisfy the above relationship, fixability of the image may be even more improved.

The reason why the abrasion resistance of the image may be improved when the resin particles in the fixation layer and the resin particles in the aqueous ink satisfy the above relationship is not clear, but it is considered to be because the resin particles in the fixation layer (fixation composition) temporarily hold the aqueous ink solvent during drying, thereby promoting the film formation of the resin particles contained in the aqueous ink to improve the abrasion resistance of the recorded image.

In the invention, if Tgi of the resin particles contained in the aqueous ink is higher than Tgc of the resin particles contained in the fixation layer, formation of the blocking layer prior to the film formation of the resin particles in the aqueous ink may not be sufficient, and the effect of blocking the permeation of the ink solvent may lower and the abrasion resistance of the recorded image may deteriorate. Preferably, Tgi and Tgc satisfy the relationship of 15° C.≦Tgi≦Tgc, more preferably 25° C.≦Tgi≦Tgc. When two or more kinds of resin particles are contained in the aqueous ink and/or fixation layer, at least one kind of resin particles in each of the aqueous ink and fixation layer has a Tg that satisfies the above-described relationship. When two or more kinds of resin particles (such as latex) are contained in the aqueous ink, at least one kind of resin particles has a Tg that satisfies the relationship of Tgb≦Tgi described below, and other relationships including the same.

More preferably, Tgi and the glass transition temperature of the polymer component in the blocking layer Tgb satisfy the relationship of Tgb≦Tgi, and more preferably satisfy the relationship of Tgb≦Tgi≦Tgc. When Tgi of the resin particles contained in the aqueous ink is equal to or more than Tgb of the polymer component contained in the blocking layer, occurrence of discontinuous lines or solution puddles may be suppressed, thereby enabling the formation of a uniform and fine image, and the image quality may be even more improved.

In particular, Tgb and Tgi preferably satisfy a relationship of −10° C.≦Tgb≦Tgi, and more preferably satisfy a relationship of 0° C.≦Tgb≦Tgi. When two or more kinds of resin particles are contained in the blocking layer, at least one kind of resin particles has a Tg that satisfies the above-described relationship.

Details of the ranges of Tgb, Tgi, and Tgc in the invention will be described later.

—Calculation of Glass Transition Temperature (Tg)—

The glass transition temperature (Tg) of the resin particles (such as latex) and the polymer component can be calculated by the following formula:

$$1/Tg = \Sigma(Xk/Tgk)$$

When the polymer component is a copolymer of n (k=1 to n) kinds of monomer components, Xk represents a weight fraction (ΣXk=1) of the kth monomer, and Tgk represents a glass transition temperature (absolute temperature) of a homopolymer formed from the kth monomer. Σ is the sum of k=1 to K=n. The glass transition temperature (Tgk) of the homopolymer of each monomer is widely known and is described in, for example, Polymer Handbook, 3rd Edition, authored by J. Brandrup, edited by E. H. Immergut, Wiley-Interscience, 1989.

In the image recording method of the invention, a blocking layer is formed on a recording medium such as paper by applying a blocking composition containing a resin dispersed in the form of an emulsion or dissolved in a solution; a fixation layer is formed on the blacking layer by applying a fixation composition that fixes a component in the aqueous ink; and then an aqueous ink is applied onto the fixation layer to form and image.

The steps included in the image recording method of the invention are further described below.

—Blocking Layer Formation Step—

In the blocking layer formation step, a blocking layer is formed on a recording medium. The blocking layer contains a polymer component and blocks the permeation of solvent (at least water and a water-soluble organic solvent) in the aqueous ink into the recording medium. Since the blocking layer contains a polymer component, it has a film formation property and suppresses the permeation of solvent in the aqueous ink, thereby preventing curling of the recording medium that may occur after the image recording.

The blocking layer may be formed from, as a permeation blocking material, a composition capable of forming a film after being applied onto a recording medium and blocking the permeation of water and water-soluble organic solvent during the image formation (blocking composition).

The blocking composition may be, for example, an emulsion containing a polymer component dispersed therein or a solution containing a polymer components dissolved therein. The solvent may be an organic solvent or water. The organic solvent is not particularly limited, and examples thereof include: hydrocarbon solvents such as toluene, hexane, cyclohexane, benzene, octane, and isooctane; ester solvents such as ethyl acetate, butyl acetate, and γ-butyrolactone; ketone solvents such as acetone, methyl ethyl ketone, methyl isobutyl ketone, and cyclohexanone; alcohol solvents such as methanol, ethanol, propanol, isopropanol, and butanol; halogen solvents such as dichloroethane and chloroform; ether solvents such as diethyl ether and tetrahydrofuran; and amido solvents such as N,N-dimethylformamide, N,N-dimethylacetamide, N-methyl-2-pyrrolidone, N-ethyl-2-pyrrolidone, N-methyl-ϵ-caprolactam, and hexamethylphosphoramide. Other preferable examples include water-soluble organic solvents used in the aqueous ink described later.

The solvent used for coating may be prepared as appropriate in consideration of spreadability of the blocking composition, film formation properties of the polymer component (such as latex), stability of the solution, and regulation of curling during application and drying of the blocking composition. Two or more solvents may be used in combination.

In particular, it is effective to use a mixture of water and water-soluble organic solvent from the viewpoint of reducing the damages on environment or production facilities, achieving stability of the composition and a blocking property of the blocking layer against the solvent in the aqueous ink. In this case, the mixing ratio and the type of the water-soluble organic solvent are selected so that curling does not occur. The content of the water-soluble organic solvent is preferably 3% by volume or more, more preferably 5% by volume or more, even more preferably 10% by volume or more, and particularly preferably 20% by volume or more and 60% by volume or less.

Examples of the polymer component include vinyl acetate-based polymers, acrylic polymers, styrenic polymers, vinyl chloride-based polymers, polyester-based polymers, polyurethane-based polymers, SBR-based polymers, NBR-based polymers, acetal-based polymers, and poly(vinyl alcohol)-based polymers.

In the blocking composition according to the invention, the polymer component is preferably a latex of polymer particles, and more preferably a latex containing particles of a vinyl acetate-based polymer, an acrylic polymer, a styrene polymer, an SBR-based polymer, a polyester-based polymer, a vinyl chloride-based polymer, or the like. Examples of commercially available latexes which may be used in the invention include VINYBLAN 601 (vinyl acetate-based latex, manufactured by Shin-Etsu Chemical Co., Ltd.), LX-815 (acrylic latex, manufactured by Nippon Zeon Co., Ltd.), VINYBLAN 609 (vinyl chloride-based latex, manufactured by Shin-Etsu Chemical Co., Ltd.), VYLONAL MD-1480 (polyester-based latex, manufactured by Toyobo Co., Ltd.).

The latex particles that may be used in the invention preferably have a weight average molecular weight (Mw) of 5,000 to 500,000, more preferably from 8,000 to 200,000. The volume average particle diameter of the latex particles is preferably from 10 nm to 1 μm, more preferably from 10 to 200 nm.

The particle size distribution of the latex is not particularly limited, and either a latex having a broad particle size distribution or a latex having a monodispersed particle size distribution may be used. It is also possible to use two or more kinds of polymer fine particles each having a monodispersed particle size distribution in combination.

The range of $T_{gb}$ of the polymer component is preferably from −10 to 70° C., and more preferably from 0° C. to 40° C. When the $T_{gb}$ is −10° C. or more, favorable handleability of the blocking composition may be achieved, and when $T_{gb}$ is 70° C. or lower, the film may be formed in a favorable manner and curling may be effectively suppressed.

The formation of the blocking layer may be carried out by any method, such as an inkjet method of ejecting a permeation inhibitor, a spray coating method, or a roller coating method. Among them, an inkjet method is preferred from the viewpoint of selectively forming a blocking layer at a portion onto which the later-described aqueous ink is to be applied.

The inkjet method is not particularly limited, and may be a known system such as a charge controlling system in which ink is jetted using an electrostatic attraction force, a drop-on-demand system (pressure pulse system) using a vibratory pressure of piezo elements, an acoustic inkjet system in which ink is jetted by means of radiation pressure by irradiating the ink with acoustic beams that has been converted from an electric signal, and a thermal inkjet system (BUBBLE JET, registered trademark) in which a pressure that has been generated from bubbles formed in the ink by heating. In particular, it is effective to apply the inkjet system described in JP-A No. 54-59936 in which heat energy is applied to ink to cause a rapid change in the volume of the like, and ink is jetted from a nozzle by means of an acting force that has been generated by the above change.

Other examples of the inkjet system include a system of jetting a number of droplets of ink having a low color density called as photo ink at a small volume, a system of improving the image quality using plural kinds of ink having substantially the same color hue but different density, and a system of using a colorless, transparent ink.

The inkjet head used in the inkjet method may be either an on demand-type head or continuous-type head. Specific examples of the ejection system include, but not limited to, an electromechanical conversion system (for example, single cavity type, double cavity type, bender type, piston type, share mode type, and shared wall type), electrothermal conversion system (for example, thermal inkjet type and BUBBLE JET (registered trademark) type), static suction system (for example, electric field control type and slit jet type), and electrical discharge system (for example, spark jet type).

The ink nozzle used in the inkjet recording is not particularly limited, and may be appropriately selected according to purposes.

The content of the polymer component in the blocking layer is preferably from 0.5 to 5.0 g/m², and more preferably from 1.0 to 3.0 g/m². When the content of the polymer component is 0.5 g/m² or more, favorable effects of suppressing the permeation of the solvent may be achieved, and when the content of the polymer component is 5.0 g/m² or less, abrasion resistance may be effectively improved.

Prior to forming the blocking layer, it is preferable to increase the temperature of the recording medium to a level higher than the minimum film formation temperature of the polymer component in the blocking layer. By increasing the temperature of a surface of the recording medium onto which the blocking layer is to be formed in advance, film formation may be readily conducted and curling may be effectively suppressed. The heating of the recording medium may be carried out by a method of using a heating device such as a heater placed at one side of the recording medium opposite to the side onto which the blocking layer is to be formed (for example, when the recording medium is automatically conveyed by a conveyor, below the conveyor on which the recording medium is to be placed); a method of blowing a side of the recording medium onto which the blocking layer is to be formed with a warm or hot air; or a method of using an infrared heater. Two or more of these heating methods may be used in combination. In view of facilitating the film formation and suppressing the occurrence of curling, a method of blowing a side of the recording medium onto which the blocking layer is to be formed with a warm or hot air while heating the recording medium from the other side is preferable.

The surface temperature of the recording medium may vary depending on the type of the recording medium (for example, material and thickness) or environmental temperature. Therefore, it is preferable to form a blocking layer while controlling the temperature by providing a measuring unit that measures the surface temperature of the recording medium and a control device that feeds back the value of surface temperature of the recording medium measured by the measuring unit to a heating control unit. The measuring unit that measures the surface temperature of the recording medium is preferably a contact or non-contact thermometer.

After the blocking layer formation step, the image recording method may include a film formation step in which film formation of the block layer is promoted by drying and/or heating, prior to the later-described fixation layer formation step. After the application of the blocking composition onto the recording medium, film formation of the blocking composition may be promoted by blowing with a dry air such as a warm or hot air, or heating with a heating device such as a heater, so that the permeation of the ink solvent upon application of the aqueous ink is further suppressed.

In this case, the drying treatment is preferably carried out by blowing with a warm or hot air at a temperature range of 40 to 130° C. The heating treatment is preferably carried out at a temperature range of from 40 to 80° C. In order to improve the film formation efficiency, the drying treatment and heat treatment may be carried out simultaneously, for example, by drying one side of a recording medium with the blocking layer while heating the other side of the recording medium.

—Fixation Layer Formation Step—

In the fixation layer formation step, a fixation layer is formed on the blocking layer that has been formed in the aforementioned blocking layer formation step. The fixation layer contains resin particles and a material that fixes a component of the aqueous ink. By providing the fixation layer, the component of the aqueous ink aggregates or the viscosity of the aqueous ink increases, thereby suppressing the deposition interference or bleeding of the aqueous ink which tends to occur when a blocking layer is provided, and fixing the component of the aqueous ink to enable uniform delineation of lines or fine images. As a result, it is possible to form a high-quality image.

The fixation layer may be formed by applying a composition containing a material that fixes a component of an aqueous ink, resin particles, water, and other components as necessary (the later-described fixation composition) onto a recording medium, and then forming a film from the fixation composition. By forming a film from the fixation composition after the application, pigment floating may be prevented.

<Material that Fixes a Component of Aqueous Ink>

The fixation layer and the fixation composition that forms the fixation layer each contain at least one material that fixes a component of the aqueous ink. The material fixes the image by increasing the viscosity of the aqueous ink or causing aggregation of the component of the aqueous ink.

The material that fixes the component of the aqueous ink is preferably, for example, a material that reacts with the aqueous ink to precipitate or insolubilize the component of the ink, or a material that forms a semi-solid substance (gel) containing the component of the aqueous ink. Specific examples of the material include a salt of a metal having a valency of two or more, an acid having a valency of two ore more, and polyallylamines and derivatives thereof. Among them, materials having high solubility such as an acid having a valency of two ore more and a salt thereof are more preferred in view of forming a film to prevent pigment floating and immediately reacting upon contact with the aqueous ink. The material that fixes the component of the aqueous ink may be used alone or in combination of two or more.

Examples of the salt of a metal having a valency of two or more include those of alkaline earth metals of Group 2 in the periodic table (for example, magnesium and calcium), transition metals of Group 3 in the periodic table (for example, lanthanum), metals of Group 13 in the periodic table (for example, aluminum), and lanthanides (for example, neodymium). Among these, carboxylates (such as formate, acetate, and benzoate), nitrates, chlorides, and thiocyanates are preferred. In particular, a carboxylate (such as formate, acetate, and benzoate) of calcium or magnesium, a nitrate of calcium or magnesium, calcium chloride, magnesium chloride, and a thiocyanate of calcium or magnesium are more preferred.

The acid having a valency of two or more preferably has a first pKa of 3.5 or less, more preferably 3.0 or less. Specific examples of such acids include phosphoric acid, oxalic acid, malonic acid, and citric acid.

The content of the material that fixes the component of the aqueous ink in the fixation layer may be adjusted according to the amount of the aqueous ink droplets to be fixed, but is preferably from 0.3 g/m² to 2.0 g/m², more preferably from 0.4 g/m² to 1.0 g/m² in terms of application amount (solid content) per area. When the application amount is 0.3 g/m² or more, fixation of the ink may be favorably carried out, and when the application amount is 2.0 g/m² or less, the acid may be effectively used for the fixation of the ink without leaving much acid to remain, which is advantageous in improving the abrasion resistance of an image.

<Resin Particles>

The fixation layer and the fixation composition that forms the layer each contain at least one kind of resin particles. The resin particles (such as latex) serve to form a film from the fixation composition and contribute to fix an image.

The resin particles contained in the fixation composition may be arbitrarily selected as long as they satisfy the above Tg relationship. Examples of the resin particles include a polymer latex containing particles of acrylic resins, vinyl acetate-based resins, styrene-butadiene-based resins, vinyl chloride-based resins, acryl-styrene-based resins, butadiene-based resin, styrene resins, crosslinked acrylic resin, crosslinked styrene resins, benzoguanamine resins, phenol resins, silicone resins, epoxy resins, urethane-based resins, paraffin-based resins, and fluorine-based resins. Among these, acrylic resins, acryl-styrene-based resins, styrene resins, crosslinked acrylic resins, and crosslinked styrene resins are preferred. Polymer latexes containing these resin particles are suitably used.

Since the latex is used as an acidic solution or a solution containing a salt of a metal of bivalent or higher, the latex preferably has high dispersion stability. One preferable example is a soap-free latex such as a soap-free polyester latex. Specifically, examples of the commercially available soap-free latex include VYLONAL MD-1200 (Tg: 67° C.), VYLONAL MD-1100 (Tg: 40° C.) (manufactured by Toyobo Co., Ltd.), PLASCOAT Z-561 (Tg: 64° C.), and PLASCOAT Z-221 (Tg: 47° C.) (manufactured by Goo Chemical Co., Ltd.).

The resin particles (or a latex thereof) preferably have a Tgc of from 10° C. to 80° C., more preferably from 20 to 70° C. When Tgc is 10° C. or more, it may be convenient for handling of the solution, and when Tgc is 80° C. or lower, abrasion resistance may be improved.

The weight average molecular weight (Mw) of the latex particles is preferably from 8,000 to 500,000, more preferably from 10,000 to 200,000.

The volume average particle size of the latex particles is preferably from 10 nm to 1 μm, more preferably from 20 to 200 nm.

The particle size distribution of the resin particles is not particularly limited, and either resin particles having a broad particle size distribution or resin particles having a monodispersed particle size distribution may be used. It is also possible to use two or more types of polymer particles each having a monodispersed particle size distribution in combination.

The content of the resin particles in the fixation layer may be adjusted according to the amount of the aqueous ink droplets to be fixed, but is preferably from 0.1 $g/m^2$ to 2.0 $g/m^2$, more preferably 0.2 $g/m^2$ to 1.0 $g/m^2$ in terms of solid content. When the solid content of the resin particles is 0.1 $g/m^2$ or more, favorable abrasion resistance may be achieved, and when the solid content of the resin particles is 2.0 $g/m^2$ or less, occurrence of problems such as pile height may be prevented.

<Other Components>

The fixation layer may further contain other components as long as they do not impair the effects of the invention. Examples of the other components include known additives such as an anti-drying agent (humectant), an anti-fading agent, an emulsification stabilizer, a permeation promoter, an ultraviolet absorber, an antiseptic, a fungicide, a pH controlling agent, a surface tension regulator, an anti-foaming agent, a viscosity regulator, a dispersant, a dispersion stabilizer, a rust preventive, and a chelating agent. Other examples include those described later as the other additives that may be used in the aqueous ink.

The pH (25° C.) of the fixation composition is preferably 6 or less, more preferably 4 or less. More specifically, the pH (25° C.) is preferably from 1 to 4, and particularly preferably from 1 to 3. In this case, the pH (25° C.) of the later-described aqueous ink is preferably 7.5 or more, and more preferably 8 or more.

In particular, in the invention, the pH (25° C.) of the aqueous ink is preferably 7.5 or more, and the pH (25° C.) of the fixation composition is preferably 4 or less, from the viewpoints of improving image density, resolution or inkjet recording speed.

The fixation layer may be formed by any method such as an inkjet method, a spray coating method, or a roller coating method. Among them, the inkjet method capable of selectively forming the fixation layer to a portion onto which the later-described aqueous ink is to be deposited is preferable. Details of the inkjet method are described above.

In the invention, since the fixation layer is formed (or the fixation composition is applied) at a portion on which the above-described blocking layer has been formed (or the blocking composition has been applied), the fixation composition is blocked by the blocking layer and permeation of the fixation composition into the recording medium is suppressed. Accordingly, it is preferable to provide a step of drying (evaporating) the solvent to remove from the fixation composition after the application thereof. By carrying out the drying (evaporation), it is possible to prevent pigment floating (a phenomenon that a component of the aqueous ink that has aggregated floats in the fixation composition without adhering to the recording medium (in particular, a permeation inhibitor)), and the dots that form an image (aqueous ink droplets) may be fixed to a desired position. During drying, the film surface temperature of the fixation composition is preferably equal to or lower than the Tgc of the resin particles (such as latex) contained in the fixation composition. When the film surface temperature during drying is equal to or lower than the Tgc, the resin particles (such as a latex) in the fixation composition do not form a film, and thus the reactivity of the "material that fixes the components of the aqueous ink" in the fixation composition is maintained. In addition, the ability of retaining the solvent in the composition may be maintained, and thus the abrasion resistance of the image may be improved.

—Image Recording Step—

In the image recording step, an image is recorded by applying, onto the fixation layer that has been formed in the aforementioned fixation layer formation step, an aqueous ink containing a pigment, resin particles, a water-soluble organic solvent and water, by an inkjet method. In the invention, since the component of the aqueous ink is fixed to the fixation layer that has been formed from the fixation composition, it is possible to suppress gathering, bleeding, or deposition interference among the ink dots, thereby enabling high speed recording with a high definition. Specifically, an image with a definition of as high as 1200 dpi or more may be recorded by an inkjet method employing a single-pass system at a delivery speed of, for example, 500 mm/second or more.

When the aqueous ink is ejected to contact the fixation composition or the fixation layer formed from the composition, at least the pigment and the resin particles (such as latex) of the component of the aqueous ink are fixed.

Details of the inkjet method are as described above.

The aqueous ink may be used not only for the formation of a monochrome image, but also for a multicolor image (for example, a full color image) by using one or more inks of desired colors. In order to form a full color image, magenta, cyan, and yellow inks may be used as the aqueous inks. In order to adjust the color tone, a black ink may be used in combination.

Further, it is possible to use ink compositions having other colors than yellow (Y), magenta (M) and cyan (C), such as red (R), green (G), blue (B) or white (W), or so-called special color inks used in the printing field.

The ink compositions of the above colors may be prepared by changing the color of the pigment used as a coloring agent as appropriate.

Details of the aqueous ink will be described later.

—Other Steps—

After the image recording step, a step of drying and evaporating the solvent (particularly water) to remove from the aqueous ink may be provided. Additionally, a step of absorbing the solvent in the aqueous ink to remove by contacting a roller formed from a porous material with the surface of the recording medium may be provided in place of the above drying step, or in combination with the above drying step.

Further, after the image recording step, a step of fixing the image that has been formed on the recording medium may be provided, in which the image is fixed by means of at least one of a pressure application device that applies pressure at least to the image or a heating device that applies heat at least to the image. The step may be conducted by, for example, contacting or pressing a heated roller or plate to the surface of the recording medium. As a result, it is possible to melt the resin particles (such as latex) or polymer component contained in the aqueous ink or blocking layer to improve the adhesion between the component of the aqueous ink and the blocking layer, or the adhesion between the blocking layer and the recording medium. The heating temperature is preferably higher than Tgi of the resin particles in the aqueous ink, Tgc of the resin particles (latex) in the fixation layer (fixation composition), and Tgb of the polymer component in the blocking layer (blocking composition).

—Recording Medium—

The recording medium used in the image recording method of the invention is not particularly limited, and may be general printing paper composed mainly of cellulose and used for common offset printing, such as book paper, coated paper or art paper. When an image is formed on the aforementioned general printing paper composed mainly of cellulose by a common inkjet method using an aqueous ink, curling of the paper may occur due to the permeation of the aqueous ink solvent such as water or water-soluble organic solvent, thereby deteriorating the image quality. On the other hand, according to the image recording method of the invention, it is possible to suppress the curling of paper and enable high-quality image recording.

The recording medium may be selected from commercially available ones. Examples of the recording medium include book paper (A) such as "OK PRINCE High Quality" manufactured by Oji Paper Co., Ltd., "SHIORAI" manufactured by Nippon Paper Group, and "NEW NPI High Quality" manufactured by Nippon Paper Group Inc.; lightweight coated paper such as "OK EVER LIGHT COAT" manufactured by Oji Paper Co., Ltd. and "AURORA S" manufactured by Nippon Paper Group; lightweight coated paper (A3) such as "U-LITE" manufactured by Nippon Paper Group Inc., "OK COAT L" manufactured by Oji Paper Co., Ltd. and "AURORA L" manufactured by Nippon Paper Group; coated paper (A2, B2) such as "OK TOP COAT+" manufactured by Oji Paper Co., Ltd. and "AURORA COAT" manufactured by Nippon Paper Group; art paper (A1) such as "OK KANEFUJI+" manufactured by Oji Paper Co., Ltd. and "TOKUBISHI ART" manufactured by Mitsubishi Paper Mills Ltd., and various kinds of photographic paper for use in inkjet recording.

<Ink Set>

The ink set of the invention includes a blocking composition, an aqueous ink and a fixation composition. The blocking composition contains water and a polymer component (such as resin particles), and capable of forming a film that blocks permeation of water or water-soluble organic solvent into a recording medium. The aqueous ink contains water, a pigment, resin particles, and a water-soluble organic solvent. The fixation composition contains water, resin particles and a material that fixes the component of the aqueous ink upon mixing with the aqueous ink, and is capable of forming a film.

In the ink set of the invention, the glass transition temperature of the resin particles contained in the aqueous ink (Tgi; ° C.) and the glass transition temperature of the resin particles contained in the fixation composition (Tgc; ° C.) satisfy the relationship of $Tgi \leq Tgc$.

Similarly to the case of the aforementioned image recording method, the ink set of the invention includes a fixation composition containing resin particles (such as latex), and the glass transition temperature of the resin particles contained in the fixation composition (Tgc) and the glass transition temperature of the resin particles contained in the aqueous ink (Tgi) satisfy the relationship of $Tgi \leq Tgc$. Therefore, a blocking layer is formed prior to the formation of a film from the resin particles contained in the aqueous ink, and the blocking layer blocks the permeation of the ink solvent into the recording medium, thereby preventing curling and improving the abrasion resistance of the recorded image. When Tgi and Tgc satisfy the above relationship, fixation of the image may also be improved.

Although the reason for the above is not clear, it is considered to be because the resin particles contained in the fixation composition temporarily hold the aqueous ink solvent during drying, thereby promoting the formation of a film from the resin particles contained in the aqueous ink to improve the abrasion resistance of the recorded image.

The blocking composition contains at least a polymer component (such as resin particles) and water, and is capable of forming a film that blocks permeation of water or water-soluble organic solvent. By forming a blocking film from the blocking composition, permeation of water or water-soluble organic solvent into a recording medium may be blocked. In addition, when the glass transition temperature of the resin component (such as resin particles) in the blocking composition (Tgb) satisfies the relationship of $Tgb \leq Tgi$, favorable film-formation property against the aqueous ink to be applied may be achieved, and permeation of water or water-soluble organic solvent contained in the aqueous ink may be suppressed by forming a blocking layer in advance.

Details of each component of the blocking composition, such as resin particles (latex), are as described above.

The content of the polymer component (such as resin particles) in the blocking composition is preferably from 5 to 60% by mass, more preferably from 10 to 50% by mass, with respect to the total solid content of the composition. When the content of the polymer component is 5% by mass or more, a film may be formed and favorable blocking performance against the permeation of a solvent may be achieved, and when the content of the polymer component is 60% by mass or less, removability or handleability of the composition, or uniformity of the formed blocking layer may be favorable.

The fixation composition contains water, resin particles, and a material that fixes the component of the aqueous ink upon mixing with the aqueous ink, and is capable of forming a film. As necessary, other components may be included in the fixation composition. By forming a film from the fixation composition, it is possible to fix an image by increasing the viscosity of the aqueous ink or causing aggregation of a component in the aqueous ink upon mixing with the aqueous ink. As a result, deposition interference and bleeding of the aqueous ink that is to be applied later may be prevented, thereby enabling uniform delineation of lines or fine images.

Details of each component in the fixation composition, such as the resin particles (latex) or the material that fixes the component in the aqueous ink are as described above.

The content of the resin particles in the fixation composition is preferably from 0.5 to 30% by mass, more preferably from 1 to 20% by mass with respect to the total solid content of the composition. When the content of the resin particles is 0.5% by mass or more, the fixation composition may form a film and the recorded image may be favorably fixed, and when the content of the resin particles is 30% by mass or less, handleability of the composition may be favorable and a uniform image may be formed.

The content of the material that fixes the component in the aqueous ink is preferably from 5 to 40% by mass, more preferably from 7 to 20% by mass with respect to the total mass of the composition. When the content of the material is 5% by mass or more, aggregation of the composition may be favorably achieved and the viscosity of the aqueous ink may be favorably increased, and when the content of the material is 40% by mass or less, long-term stability of the fixation composition may be favorable and a uniform image may be favorably formed.

—Aqueous Ink—

The aqueous ink contains a pigment, resin particles, a water-soluble organic solvent, and water. The aqueous ink may further contain other components such as a dispersant or other additive, as necessary.

In the following, details of the ingredients of the aqueous ink according to the invention are described.

(Resin Particles)

The aqueous ink according to the invention contains at least one kind of resin particles. By including the resin particles, fixability of the aqueous ink to a recording medium or abrasion resistance of the recorded image may be even more improved. The resin particles aggregate or destabilize upon contact with the above-described fixation composition or the fixation layer formed from the composition, thereby increasing the viscosity of the aqueous ink, namely, fixing the image. The resin particles are preferably in the form of a dispersion in water or a hydrous organic solvent.

The resin particles may be selected from various kinds of resin fine particles of styrene resin, acrylic resin, vinyl acetate-based resin, polyester-based resin, or the like. In particular, acrylic resin particles are preferred. More specifically, various kinds of latex including styrene latex, acrylic latex, vinyl acetate-based latex, and polyester-based latex are suitable used. Among these, acrylic latex is preferred.

The resin particles (such as latex), which aggregate or destabilize upon contact with the fixation composition or the fixation layer formed from the fixation composition to increase the viscosity of the ink, preferably have a zeta potential that changes in response to the change in pH. For example, the resin particles (such as latex) preferably have a carboxylic acid group on the surface thereof, and decrease the dispersion stability thereof in response to the reduction in pH.

Other preferred examples include resin particles (such as latex) that have an anionic functional group on the surface thereof and are destabilized by a metal ion of bivalent or higher; and polarity-changing resin particles (such as latex) that have a cationic functional group and an anionic functional groups on the surface thereof, and changes the polarity thereof according to the change in pH.

In addition, soap-free latexes, having high reactivity, are also preferred.

The glass transition temperature (Tg) of the resin particles (latex particles) is not particularly limited as long as it satisfies the relationship with the above-described Tgc of the resin particles contained in the fixation composition. From the viewpoint of storage stability of the aqueous ink, the resin particles (latex) preferably has a glass transition temperature that is not less than room temperature, specifically 30° C. or more, more preferably 40° C. or more, and even more preferably 50° C. or more.

The volume average particle size of the resin particles (latex particles) is preferably from 10 nm to 1 μm, more preferably from 10 nm to 500 nm, even more preferably from 20 nm to 200 nm, and particularly preferably from 50 nm to 200 nm. The particle size distribution of the resin particles (latex particles) are not particularly limited, and either resin particles having a broad particle size distribution or resin particles having a monodispersed particle size distribution may be used. It is also possible to use two or more kinds of resin particles each having a monodispersed particle size distribution in combination.

As the resin particles (latex), commercially available products such as the following may be used: ARON HD-5 (Tg: 45° C.) (manufactured by Toagosei Co., Ltd. chemical), JON-CRYL 537 (Tg: 49° C.), JONCRYL 775 (Tg: 37° C.) (manufactured by BASF Japan Ltd.), and JULIMER ET-410 (Tg: 44° C.) (manufactured by Nihonjunyaku Co., Ltd.).

(Pigment)

The aqueous ink according to the invention contains at least one kind of pigment. The pigment may be arbitrarily selected according to purposes, and may be either an organic pigment or an inorganic pigment.

Examples of the organic pigment include azo pigments, polycyclic pigments, dye chelates, nitro pigments, nitroso pigments, and aniline black. Among these, azo pigments and polycyclic pigments are more preferred.

Examples of the inorganic pigments include titanium oxide, iron oxide, calcium carbonate, barium sulfate, aluminum hydroxide, barium yellow, cadmium red, chrome yellow, and carbon black. Among these, carbon black is particularly preferred.

Examples of the organic pigment having an orange or yellow color include C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128, C. I. Pigment Yellow 138, C. I. Pigment Yellow 151, C. I. Pigment Yellow 155, C. I. Pigment Yellow 180, and C. I. Pigment Yellow 185.

Examples of the organic pigment having a magenta or red color include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178, C. I. Pigment Red 222, and C. I. Pigment Violet 19.

Examples of the organic pigment having a green or cyan color include C. I. Pigment Blue 15, C. I. Pigment Blue 15:2, C. I. Pigment Blue 15:3, C. I. Pigment Blue 15:4, C. I. Pigment Blue 16, C. I. Pigment Blue 60, C. I. Pigment Green 7, and siloxane-crosslinked aluminum phthalocyanines described in U.S. Pat. No. 4,311,775.

Examples of the organic pigment having a black color include C. I. Pigment Black 1, C. I. Pigment Black 6, and C. I. Pigment Black 7.

The average particle size of the organic pigment is preferably small from the viewpoints of transparency and color reproducibility, while it is preferably large from the viewpoint of light resistance. In order to achieve the above properties at the same time, the average particle size is preferably from 10 to 200 nm, more preferably from 10 to 150 nm, and even more preferably from 10 to 100 nm. The particle size distribution of the organic pigment is not particularly limited, and either an organic pigment having a broad particle size distribution or an organic pigment having a monodispersed particle size distribution may be used. It is also possible to use two or more organic pigments each having a monodispersed particle size distribution in combination.

The content of the pigment is preferably from 1 to 25% by mass, more preferably from 2 to 20% by mass, even more preferably from 5 to 20% by mass, and particularly preferably from 5 to 15% by mass, with respect to the total mass of the aqueous ink.

(Dispersant)

The aqueous ink according to the invention may contain at least one kind of a dispersant. The dispersant for dispersing a pigment may be either a polymeric dispersant or a low-molecular surfactant-type dispersant. The polymeric dispersant may be either water-soluble or water-insoluble.

The low-molecular surfactant-type dispersant can disperse a pigment in an aqueous medium in a stable manner, while maintaining the viscosity of the ink at low level. The low-molecular surfactant-type dispersant typically has a molecular weight of 2,000 or less, but is preferably from 100 to 2,000, more preferably from 200 to 2,000.

The low-molecular surfactant-type dispersant as mentioned above has a hydrophilic group and a hydrophobic group. The number of hydrophilic group and hydrophobic group in a molecule is not particularly limited as long as at least one of each group is present in the molecule, and two or more kinds of hydrophilic group or hydrophobic group may be present in combination. A linkage group that links the hydrophilic group and hydrophobic group may also be present in the molecule.

The hydrophilic groups include anionic groups, cationic groups, nonionic groups, and betaine groups that include the aforementioned groups in combination.

The anionic groups are not particularly limited as long as the group has a negative charge, but preferably a phosphoric group, a phosphonic group, a phosphinic group, a sulfate group, a sulfonic group, a sulfinic group or a carboxyl group, more preferably a phosphoric group or a carboxyl group, and further preferably a carboxyl group.

The cationic groups are not particularly limited as long as the group has a positive charge, but preferably organic cationic group, more preferably a cationic group of nitrogen or phosphorous, and further preferably pyridinium cationic group or ammonium cationic group.

The nonionic groups include a moiety of polyethylene oxide, polyglycerin or a sugar unit.

The hydrophilic groups are preferably an anionic group as described above.

When the low-molecular surfactant-type dispersant has an anionic hydrophilic group, the dispersant preferably has a pKa of 3 or more, in terms of promoting aggregation reaction upon contact with an acidic pretreatment composition. The pKa mentioned here is an experimental value calculated from a titration curve obtained by titrating a solution containing tetrahydrofuran and water at a ratio of 3:2 (THF:water, V/V), to which 1 mmol/L of a low-molecular surfactant-type dispersant is dissolved, with an acid or alkali aqueous solution. When the pKa of low-molecular surfactant-type dispersant is 3 or more, 50% or more of anionic groups theoretically becomes undissociated upon contact with a liquid having a pH of around 3. Accordingly, the solubility to water of the dispersant is significantly reduced to cause aggregation reaction, namely, increase the aggregation reactivity. From this point of view, the low-molecular surfactant-type dispersant preferably has a carboxyl group as the anionic group.

The hydrophobic group has a hydrocarbon structure, fluorocarbon structure, silicone structure or the like, particularly preferably a hydrocarbon structure. The hydrophobic group may have either a straight-chain structure or a branched structure. Further, the hydrophobic group may have one or more chain, and when there are two or more chains, two or more kinds of hydrophobic group may exist. The hydrophobic group is preferably a hydrocarbon group having a carbon number of from 2 to 24, more preferably from 4 to 24, and yet more preferably from 6 to 20.

The water-soluble dispersants include a hydrophilic polymeric compound. Natural hydrophilic polymeric compounds include plant polymers such as gum arabic, gum tragacanth, guar gum, gum karaya, locust bean gum, arabinogalactan, pectin and quince seed starch, algae polymers such as alginic acid, carrageenan and agar, animal polymers such as gelatin, casein, albumin and collagen, and microbial polymers such as xanthene gum and dextran.

Hydrophilic polymeric compounds obtained by modifying a natural raw material include fibrous polymers such as methyl cellulose, ethyl cellulose, hydroxy ethyl cellulose, hydroxy propyl cellulose and carboxy methyl cellulose, starch polymers such as sodium starch glycolate and sodium starch phosphate, and algar polymers such as sodium alginate and propylene glycol alginate.

Synthetic hydrophilic polymeric compounds include vinyl polymers such as polyvinyl alcohol, polyvinyl pyrrolidone and polyvinyl methyl ether, acrylic resins such as non-crosslinked polyacrylamide, polyacrylic acid or an alkali metal salt thereof, and water-soluble styrene acrylic acid, water-soluble styrene maleic acid resin, water-soluble vinyl naphthalene acrylic resin, water-soluble vinyl naphthalene maleic acid resins, polyvinyl pyrrolidone, polyvinyl alcohol, an alkali metal salt of a formaldehyde condensate of β-naphthalene sulfonic acid, polymeric compounds having a salt of cationic functional group such as a quaternary ammonium group or an amino group in a side chain, and natural polymeric compounds such as shellac.

Among these, hydrophilic polymeric compounds to which a carboxyl group is introduced, such as homopolymers of acrylic acid, methacrylic acid or styrene acrylic acid and copolymers including other kind of monomer having a hydrophilic group.

The water-insoluble dispersants include a polymer having both hydrophilic and hydrophobic moieties, such as styrene-(meth)acrylic acid copolymer, styrene-(meth)acrylic acid-(meth)acrylate copolymer, (meth)acrylate-(meth)acrylic acid copolymer, polyethylene glycol(meth)acrylate-(meth)acrylic acid copolymer, vinylacetate-maleic acid copolymer, and styrene-maleic acid copolymer.

The weight average molecular weight of the dispersant is preferably from 3,000 to 100,000, more preferably from 5,000 to 50,000, further preferably from 5,000 to 40,000, and yet further preferably from 10,000 to 40,000.

The mixing ratio by mass (p:s) of the pigment (p) and the dispersant (s) is preferably from 1:0.06 to 1:3, more preferably from 1:0.125 to 1:2, and further preferably from 1:0.125 to 1:1.5.

(Water-Soluble Organic Solvent)

The aqueous ink used in the present invention includes at least one kind of water-soluble organic solvent. By including the water-soluble organic solvent, effects of preventing drying, moistening, promoting penetration or the like may be obtained. In order to prevent drying, the solvent may be used as a drying inhibitor for preventing nozzle clogging due to aggregation of ink that has attached and dried at an ejection port of a nozzle. In terms of preventing drying or moistening, a water-soluble organic solvent having a lower vapor pressure than that of water is preferably used. In terms of promoting penetration, the solvent may be used as a penetration promoter for improving the penetration ability of ink in a recording medium.

As a drying inhibitor, the water-soluble organic solvent preferably has a lower vapor pressure than that of water. Examples of such solvents include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohol such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidine and N-ethyl morpholine; sulfur-containing compounds such as sulfolane, dimethyl sulfoxide and 3-sulfolene; polyfunctional compounds such as diacetone alcohol and diethanol amine; and urea derivatives.

Among these, polyhydric alcohols such as glycerin and diethylene glycol are preferable.

The drying inhibitor may be used alone or in combination of two or more. The content of drying inhibitor is preferably from 10 to 50 mass % in the aqueous ink.

As the penetration promoter, the water-soluble organic solvent is favorably used in order to promote the penetration of aqueous ink in a recording medium (such as printing paper). Examples of such solvents include alcohols such as ethanol, isopropanol, butanol, diethylene glycol monobutyl ether, triethylene glycol monobutyl ether and 1,2-hexanediol, sodium lauryl sulfate, sodium oleate, and nonionic surfactants.

The penetration promoter may be used alone or in combination of two or more. The content of penetration promoter is preferably from 5 to 30 mass % in the aqueous ink. The penetration promoter is used preferably at an amount in a range in which image bleeding or print through is not caused.

The water-soluble organic solvent may be used also for adjusting the viscosity of ink. Examples of the water-soluble organic solvent that may be used as a viscosity adjuster include alcohols such as methanol, ethanol, propanol, isopropanol, butanol, isobutanol, sec-butanol, t-butanol, pentanol, hexanol, cyclohexanol and benzyl alcohol; polyhydric alcohols such as ethylene glycol, diethylene glycol, triethylene glycol, polyethylene glycol, propylene glycol, dipropylene glycol, polypropylene glycol, butylene glycol, hexane diol, pentane diol, glycerin, hexane triol and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether; amines such as ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethylene imine and tetramethyl propylene diamine; and other polar solvents such as formamide, N,N-dimethyl formamide, N,N-dimethyl acetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone. These solvents may be used alone or in combination of two or more.

(Other Additives)

The aqueous ink used according to the invention may further include other additives than the aforementioned components, such as known additives including a drying inhibitor (moistener), discoloration inhibitor, emulsion stabilizer, penetration promoter, UV absorber, antiseptic agent, antimildew agent, pH adjuster, surface tension adjuster, antifoaming agent, viscosity adjuster, dispersant, dispersion stabilizer, antirustic agent and chelate agent. When the ink is aqueous, these additives are usually directly added to the ink. When an oily dye is used in a dispersion, these additives are usually added to the dispersion after the dye has been dispersed therein. However, these additives may be added in an oil phase or aqueous phase during the preparation of the dispersion.

The UV absorbers may be used for improving the storability of an image, and examples thereof include benzotriazole compounds described in JP-A Nos. 58-185677, 61-190537, 2-782, 5-197075 and 9-34057; benzophenone compounds described in JP-A Nos. 46-2784, 5-194483 and U.S. Pat. No. 3,214,463; cinnamic compounds described in Japanese Patent Nos. 48-30492, 56-21141 and JP-A No. 10-88106; triazine compounds described in JP-A No. 4-298503, 8-53427, 8-239368, 10-182621 and Japan National Publication No. 8-501291; and compounds described in Research Disclosure No. 24239. So-called fluorescent brighteners that emit fluorescent light by absorbing UV rays, such as stilbene compounds and benzoxazole compounds, are also applicable.

The discoloration inhibitor may be used for improving the storability of an image, and examples thereof include organic type compounds and metal complex compounds. The organic discoloration inhibitors include hydroquinones, alkoxyphenols, dialkoxyphenols, phenols, anilines, amines, indanes, chromanes, alkoxyanilines and heterocyclic compounds. The metal complex discoloration inhibitors include nickel complexes and zinc complexes. More specifically, applicable compounds include those described in the patents cited in Research Disclosure No. 17643, Section VII, Items I to J; No. 15162; No. 18716, page 650, upper left column; No. 36544, page 527; No. 307105, page 872; and No. 15162, compounds included represented by the chemical formulae or examples described in pages 127 to 137 of JP-A No. 62-215272.

The antimildew agents include sodium dehydroacetate, sodium benzoate, sodium pyridinethion-1-oxide, p-hydroxy ethyl benzoate, 1,2-benzoisothiazolin-3-one, and the salts thereof. The content of antimildew agent is preferably from 0.02 to 1.00 mass % in the aqueous ink.

The pH adjusters include neutralizers such as organic base or inorganic alkali. The pH adjuster may improve the storability of the aqueous ink. The pH adjuster is preferably added at such an amount that the pH of the ink is from 6 to 10, more preferably from 7 to 10.

The surface tension adjusters include nonionic surfactants, cationic surfactants, anionic surfactants, and betaine surfactants.

The surface tension adjuster is preferably added in such an amount that the surface tension of the ink is from 20 to 60 mN/m, more preferably from 20 to 45 mN/m, and further preferably from 25 to 40 mN/m. When the surface tension adjuster is added in an amount in the above range, the ink may be dispensed in a favorable manner in an inkjet method.

The surfactants include, as hydrocarbon surfactants, anionic surfactants such as fatty acid salt, alkyl sulfate, alkyl benzene sulfonate, alkyl naphthalene sulfonate, dialkyl sulfosucciniate, alkyl phosphate, formalin condensate of naphthalene sulfonate and polyoxyethylene alkyl sulfate, nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene-oxypropylene block copolymer. Further, acetylene-type polyoxyethyleneoxide surfactants, such as SURFYNOL series (trade name, manufactured by Air Products & Chemicals, Inc.), and amine oxide-type amphoteric surfactants such as N,N-dimethyl-N-alkylamine oxide are also favorably used. Moreover, compounds described as a surfactant in JP-A No. 59-157636, pp. 37 to 38 and Research Disclosure No. 308119 (1989) are also applicable.

The anti-abrasion properties may be improved by using fluorine (fluoroalkyl) surfactants, silicone surfactants or the like, such as those described in JP-A No. 2003-322926, 2004-325707 and 2004-309806.

The aforementioned surface tension adjusters may also be used as a defoaming agent, and fluorine compounds, silicone compounds, chelate compounds such as EDTA are also applicable.

The following are exemplary embodiments of the invention. However, the invention is not limited thereto.

1. A method of recording an image by applying an aqueous ink by an inkjet method, comprising:

forming a blocking layer on a recording medium, the blocking layer comprising a polymer component and being capable of blocking permeation of a solvent in the aqueous ink into the recording medium;

forming a fixation layer on the blocking layer, the fixation layer comprising resin particles and a material that fixes a component in the aqueous ink; and recording an image by applying the aqueous ink onto the fixation layer by an inkjet method, the aqueous ink comprising a pigment, resin particles, water-soluble organic solvent and water, wherein the glass transition temperature of the resin particles in the aqueous ink (Tgi) and the glass transition temperature of the resin particles in the fixation layer (Tgc) satisfy the relationship of Tgi≦Tgc.

2. The method according to <1>, wherein Tgi and Tgc satisfy the relationship of 15° C.≦Tgi≦Tgc.

3. The method according to <2>, wherein Tgi and Tgc satisfy the relationship of 25° C.≦Tgi≦Tgc.

4. The method according to <1>, wherein the glass transition temperature of the polymer component in the blocking layer (Tgb) and the glass transition temperature of the resin particles in the aqueous ink (Tgi) satisfy the relationship of Tgb≦Tgi.

5. The method according to <4>, wherein Tgb, Tgi and Tgc satisfy the relationship of Tgb≦Tgi≦Tgc.

6. The method according to <1>, wherein the material that fixes a component in the aqueous ink comprises an acid having a valency of two or more or a salt of a metal having a valency of two or more.

7. The method according to <1>, further comprising drying or heating the blocking layer prior to forming of the fixation layer.

8. The method according to <1>, wherein the blocking layer is formed by an inkjet method.

9. The method according to <8>, wherein the blocking layer is formed in a selective manner at a portion on which the image is to be formed.

10. The method according to <1>, further comprising fixing the image that has been recorded by applying at least one of pressure or heat to the image.

11. An ink set comprising:

a blocking composition containing a polymer component and water, the composition being capable of forming a film that blocks permeation of water or water-soluble organic solvent;

an aqueous ink containing a pigment, resin particles, water-soluble organic solvent and water; and a fixation composition containing resin particles, water and a material capable of fixing a component in the aqueous ink, the composition being capable of forming a film when mixed with the aqueous ink, wherein the glass transition temperature of the resin particles in the aqueous ink (Tgi) and the glass transition temperature of the resin particles in the fixation composition (Tgc) satisfy the relation of Tgi≦Tgc.

12. The ink set according to <11>, wherein Tgi and Tgc satisfy the relationship of 15° C.≦Tgi≦Tgc.

13. The method according to <12>, wherein Tgi and Tgc satisfy the relationship of 25° C.≦Tgi≦Tgc.

14. The ink set according to <11>, wherein the glass transition temperature of the polymer component in the blocking composition (Tgb) and the glass transition temperature of the resin particles in the aqueous ink (Tgi) satisfy the relationship of Tgb≦Tgi.

15. The ink set according to <14>, wherein Tgb, Tgi and Tgc satisfy the relationship of Tgb≦Tgi≦Tgc.

16. The ink set according to <11>, wherein the material that fixes a component in the aqueous ink comprises an acid having a valency of two or more or a salt of a metal having a valency of two or more.

17. A recorded material recorded by the method according to <1>.

EXAMPLES

The invention is further described with reference to the following Examples. However, the invention is not limited to these examples without departing from the scope of the invention. Unless otherwise noted, "part" used herein is based on mass.

Examples 1 to 4, Comparative Examples 1 to 3

Preparation of Aqueous Ink
<<Preparation of Cyan Ink C1-1>>
—Preparation of Cyan Dispersion—

In a reaction vessel, 6 parts of styrene, 11 parts of stearyl methacrylate, 4 parts of a styrene macromer (trade name: AS-6, manufactured by Toagosei Co., Ltd.), 5 parts of polypropyleneglycol monomethacrylate (BLEMMER PP-500, trade name, manufactured by NOF Corporation), 5 parts of methacrylic acid, 0.05 parts of 2-mercaptoethanol, and 24 parts of methyl ethyl ketone were mixed together to make a mixed solution.

Separately, in a dropping funnel, 14 parts of styrene, 24 parts of stearyl methacrylate, 9 parts of a styrene macromer (trade name: AS-6, manufactured by Toagosei Co., Ltd.), 9 parts of polypropyleneglycol monomethacrylate (BLEMMER PP-500, manufactured by NOF Corporation), 10 parts of methacrylic acid, 0.13 parts of 2-mercaptoethanol, 56 parts of methyl ethyl ketone, and 1.2 parts of 2,2'-azobis(2,4-dimethylvaleronitrile) were mixed together to make a mixed solution.

Subsequently, in a nitrogen atmosphere, the mixed solution in the reaction vessel was heated to 75° C. while stirring, and the mixed solution in the dropping funnel was added thereto dropwise over a period of 1 hour. 2 hours after the completion of the addition, a solution prepared by dissolving 1.2 parts of 2,2'-azobis(2,4-dimethylvaleronitrile) in 12 parts of methyl ethyl ketone was added thereto dropwise over a period of 3 hours, and the resultant was aged at 75° C. for 2 hours, and then at 80° C. for 2 hours to make a polymer dispersant solution.

A portion of the polymer dispersant solution was isolated by removing the solvent, and the solid content thus obtained was diluted with tetrahydrofuran to give a concentration of 0.1% by mass, and its weight average molecular weight was measured by high speed GPC (gel permeation chromatography) HLC-8220GPC using three columns connected in series, TSKgeL Super HZM-H, TSKgeL Super HZ4000, and TSKgeL SuperHZ2000 (trade name, manufactured by Tosoh Corporation). The weight average molecular weight was 25,000 in terms of polystyrene.

5.0 g (in terms of solid content) of the polymer dispersant solution, 10.0 g of a cyan pigment (Pigment Blue 15:3, manufactured by Dainichiseika Color & Chemicals Mfg. Co., Ltd.), 40.0 g of methyl ethyl ketone, 8.0 g of 1 mol/L (liter, hereinafter the same) sodium hydroxide, and 82.0 g of ion exchange water were put in a vessel together with 300 g of 0.1-mm zirconia beads, and dispersing was conducted at 1000 rpm for 6 hours using a disperser (READY MILL, trade name, manufactured by Aimex Co., Ltd.). The dispersion thus obtained was concentrated under reduced pressure with an evaporator until the methyl ethyl ketone was sufficiently evaporated, and further concentrated until the pigment concentration reached 10% to make a cyan dispersion C1 (water-insoluble particles A).

The volume average particle size (secondary particles) of cyan dispersion C1 as measured by a dynamic light scattering method using a particle size distribution analyzer (MICROTRAC Version 10.1.2-211BH, trade name, manufactured by Nikkiso Co., Ltd.) was 77 nm.

Cyan dispersion C1 prepared as described above was further mixed with an acrylic latex (trade name: JONCRYL 537, water-insoluble particles B, subjected to centrifugation to remove coarse particles), an organic solvent, a surfactant, and ion exchange water to make an ink having the following composition. The ink thus obtained was passed through a 5-μm filter to remove coarse particles, thus making a cyan ink C1-1.

| <Composition of cyan ink C1-1> | |
|---|---|
| Cyan pigment (Pigment Blue 15:3, manufactured by Dainichiseika Color & Chemicals Mfg. Co., Ltd.) | 4% by mass |
| Polymer dispersant solution | 2% by mass |
| Acrylic latex (trade name: JONCRYL 537, Tg: 49° C., manufactured by BASF Japan Ltd.) | 8% by mass |
| Diethylene glycol (manufactured by Wako Pure Chemical Industries, Ltd.) | 10% by mass |
| Glycerin | 20% by mass |
| OLFIN E1010 (manufactured by Nissin Chemical Industry Co., Ltd.) | 1% by mass |
| Ion exchange water | 55% by mass |

<<Preparation of Cyan Ink C1-2>>

Cyan ink C1-2 was prepared in the same manner as the preparation of cyan ink C1-1, except that JONCRYL 537 (acrylic latex) was replaced with JONCRYL 551 (Tg: 9° C., manufactured by BASF Japan Ltd.).

<<Preparation of Cyan Ink C2-1>>

26.7 g of 15% cyan pigment dispersion (CABOJET 250, trade name, manufactured by Cabot Corporation), 8 g (in terms of solid content) of an acrylic latex, 20 g of glycerin, 10 g of diethylene glycol, and 1 g of OLFIN E1010 (manufactured by Nissin Chemical Industry Co., Ltd.) were mixed together, and ion exchange water was added to the mixture to give a total amount of 100 g, thus making cyan ink C2-1 having the following composition.

| <Composition of ink C2-1> | |
|---|---|
| Cyan pigment dispersion (trade name: CABOJET 250, manufactured by Cabot Corporation) | 4% by mass |
| Acrylic latex (trade name: JONCRYL 537, Tg: 49° C., manufactured by BASF Japan Ltd.) | 8% by mass |
| Diethylene glycol (manufactured by Wako Pure Chemical Industries, Ltd.) | 10% by mass |
| Glycerin | 20% by mass |
| OLFIN E1010 (manufactured by Nissin Chemical Industry Co., Ltd.) | 1% by mass |
| Ion exchange water | 57% by mass |

<<Preparation of Magenta Ink M1-1>>

400 g of a magenta pigment (trade name: CROMOPHTAL JET MAGENTA DMQ, manufactured by Ciba Japan, K.K.), 40 g of sodium oleate (manufactured by Wako Pure Chemical Industries, Ltd.), 200 g of glycerin (manufactured by Wako Pure Chemical Industries, Ltd.), and 1360 g of ion exchange water were mixed together, and the mixture was kneaded for 1 hour in a mortar, and then coarsely dispersed for 20 minutes using a ultrasonic disperser equipped with a small stirrer (trade name: US-600CCVP, 600W, ultrasonic oscillator portion: 50 mm, manufactured by Nippon Seiki Co., Ltd.).

Subsequently, the coarse dispersion and 1.3 kg of 0.05-mm zirconia beads were put in a disperser (SUPER APEX MILL, type: SAM-1, trade name, manufactured by Kotobuki Engineering & Manufacturing Co., Ltd.), and dispersed for 160 minutes at a rotation speed of 2500 rpm and a treatment flow rate of 15 L/h. After the completion of the dispersion, the solution was passed through a 32-μm filter cloth to obtain 20% by mass of a magenta pigment dispersion M1 (water-insoluble particles A).

The volume average particle size of magenta pigment dispersion M1 as measured in the same manner as for the cyan dispersion was 70 nm.

Magenta dispersion M1 prepared as described above was further mixed with an acrylic latex (water-insoluble particles B, trade name: JONCRYL 537, coarse particles had been removed by centrifugation), an organic solvent, a surfactant, and ion exchange water to make an ink having the following composition. The ink thus obtained was passed through a 5-μm filter to remove coarse particles, thus making a magenta ink M1-1.

| <Composition of magenta ink M1-1> | |
|---|---|
| Magenta pigment (trade name: CROMOPHTAL JET MAGENTA DMQ) | 4% by mass |
| Sodium oleate (dispersant) | 0.4% by mass |
| Acrylic latex (trade name: JONCRYL 537, Tg: 49° C., manufactured by BASF Japan Ltd.) | 8% by mass |
| Diethylene glycol (manufactured by Wako Pure Chemical Industries, Ltd.) | 10% by mass |
| Glycerin (manufactured by Wako Pure Chemical Industries, Ltd.) | 20% by mass |
| OLFIN E1010 (manufactured by Nissin Chemical Industry Co., Ltd.) | 1% by mass |

<Composition of magenta ink M1-1>

| | |
|---|---|
| Fluorine-based surfactant 1 (described below) | 0.1% by mass |
| Ion exchange water | 56.5% by mass |

Fluorine-based surfactant 1

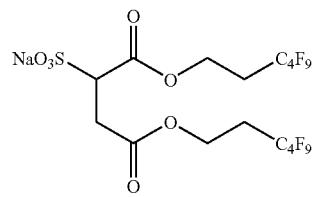

Preparation of Fixation Composition

<<Preparation of Fixation Composition T-1>>

The following components were mixed to prepare a fixation composition T-1.

<Composition of fixation composition T-1>

| | |
|---|---|
| Citric acid (manufactured by Wako Pure Chemical Industries, Ltd.) | 15 parts |
| Sodium hydroxide (manufactured by Wako Pure Chemical Industries, Ltd.) | 1.5 parts |
| Polyester latex (trade name: PLAS COAT Z-561 (Tg: 64° C., particle size: 10 nm), manufactured by Goo Chemical Co., Ltd.) | 8 parts |
| Fluorine-based surfactant 1 (described above) | 1 part |
| Ion exchange water | 74.5 parts |

<<Preparation of Fixation Composition T-2>>

A fixation composition T-2 was prepared in the same manner as in the preparation of fixation solution T-1, except that the latex was replaced with a polyester latex (trade name: VYLONAL MD-1480, Tg: 20° C., particle size: 40 nm, manufactured by Toyobo Co., Ltd.).

<<Preparation of Fixation Composition T-3>>

A fixation composition T-3 was prepared in the same manner as in the preparation of fixation composition T-1, except that the polyester latex was not added.

Preparation of Blocking Composition

<<Preparation of Blocking Composition B-1>>

A mixed solution containing 10 g of a dispersion stabilizing resin Q-1 having the following structure, 100 g of vinyl acetate, and 384 g of a solvent (trade name: ISOPAR H, manufactured by Exxon Corporation) was heated to 70° C. while stirring in a nitrogen gas stream. Thereafter, 0.8 g of 2,2'-azobis(isovaleronitrile) (hereinafter may be abbreviated as "A.I.V.N.") as a polymerization initiator was added, and the mixture was allowed to react for 3 hours. A white turbidity occurred 20 minutes after the addition of the polymerization initiator, and the reaction temperature rose up to 88° C. Subsequently, 0.5 g of the polymerization initiator was further added, and the mixture was allowed to react for 2 hours. Thereafter, the temperature was elevated to 100° C., and stirring was conducted for 2 hours to evaporate unreacted vinyl acetate. After cooling, the solution was passed through a 200-mesh nylon cloth to obtain a white dispersion. The white dispersion thus obtained was a latex dispersion that was favorably monodispersed and had a polymerization degree of 90% and a volume average particle size of 0.23 μm. The white dispersion is hereinafter referred to as "blocking composition B-1" sometimes.

A portion of the white dispersion was centrifuged for 60 minutes at a rotation speed of 1×10⁴ r.p.m., and the precipitated resin particles were collected and dried. The weight average molecular weight (Mw) of the resin particles was 2×10⁵ (in terms of polystyrene, measured by high speed GPC in the same manner as described above), and the glass transition point (Tg) was 38° C.

Dispersion stabilizing resin Q-1

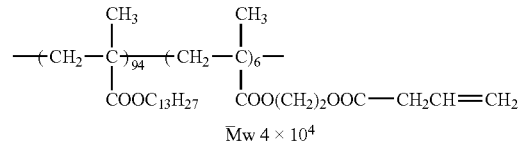

$\overline{M}w\ 4 \times 10^4$

<<Preparation of Blocking Composition B-2>>

A mixed solution containing 15 g of a dispersion stabilizing resin Q-2 having the structure shown below, 100 g of methyl acrylate, 1.3 g of methyl 3-mercaptopropionate, and 552 g of a solvent (trade name: ISOPAR H) was heated to 50° C. while stirring in a nitrogen gas stream. Thereafter, 1 g of 2,2'-azobis(2-cyclopropylpropionitrile) (hereinafter may be abbreviated as "A.C.P.P.") as a polymerization initiator was added, and the mixture was allowed to react for 2 hours. Next, 0.8 g of A.C.P.P. was further added and the mixture was allowed to react for 2 hours. Further, 0.8 g of A.I.V.N. was added and the mixture was allowed to react for 3 hours at 75° C. Subsequently, the temperature was elevated to 90° C. to evaporate the unreacted monomer under a reduced pressure of 20 to 30 mmHg. After cooling, the solution was passed through a 200-mesh nylon cloth to obtain a white dispersion. The white dispersion thus obtained was a latex dispersion that was favorably monodispersed and had a polymerization degree of 98% and a volume average particle size of 0.20 μm. The white dispersion is hereinafter referred to as "blocking composition B-2" sometimes.

A portion of the white dispersion was centrifuged for 60 minutes at a rotation speed of 1×10⁴ r.p.m., and the precipitated resin particles were collected and dried. The weight average molecular weight (Mw) of the resin particles was 3.2×10⁴ (in terms of polystyrene, measured by high speed GPC in the same manner as described above) and the glass transition point (Tg) was 98° C.

Dispersion stabilizing resin Q-2

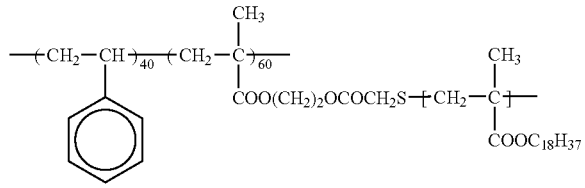

$\overline{M}w\ 5 \times 10^4$

Image Recording and Evaluation

The inkjet recording test was carried out using the ink, fixation composition, and blocking composition obtained above in accordance with the following manner. Further, evaluation of image quality, curling, and abrasion resistance of the recorded images was conducted in accordance with following methods.

<<Image Recording>>

An inkjet apparatus having a structure shown in FIG. 1 was used in the inkjet recording test. The inkjet apparatus includes a rotary belt that is trained around two driving rollers with a tension; a blocking composition ejection head 11 that sequentially ejects a blocking composition in the running direction of the rotary belt (the direction of the arrow); a first dryer 14 that dries the blocking composition by blowing with a dry air; a fixation composition ejection head 12 that ejects a fixation composition; a second dryer 15 that dries the blocking composition by blowing with a dry air; an ink ejection head set 13; a third dryer 16 that dries the image by blowing with a dry air; and a heating roll 17 that is pressed against the rotary belt. The ink ejection head set 13 includes a cyan ink ejection head 13C, a magenta ink ejection head 13M, a yellow ink ejection head 13Y, and a black ink ejection head 13B, which are arranged in this order along the running direction of the rotary belt (the direction of the arrow). Each ejection head is a full line head having a width of 1200 dpi/10 inch (drive frequency: 25 kHz, recording medium carrying speed: 500 mm/sec) and ejects ink of each color in a single-pass mode, in the main scanning direction to record an image. In the inkjet recording test of the present invention, the temperature of the heating roll was set at 60° C.

Further, heaters 24, 25, and 26 are disposed on the side of the rotary belt opposite to the side provided with the first, second and third dryers, in such a manner that each heater faces each dryer via the rotary belt. In the inkjet recording test of the present invention, heater 25 was not in action.

Ink reservoirs that are connected to each of blocking composition ejection head 11, fixation composition ejection head 12, cyan ink ejection head 13C, and magenta ink ejection: head 13M were filled with the ink, fixation composition, and blocking composition prepared above, and solid images and 1200-dpi line images were recorded on a recording medium 20. The recording medium was "U-LITE" (trade name, weight: 84.9 g/m², manufactured by Nippon Paper Group, Inc.).

In the image recording, the blocking composition, fixation composition, cyan ink, and magenta ink were ejected at a resolution of 1200 dpi×600 dpi and an ink droplet volume of 3.5 pl. The line images were recorded in a single pass mode along the main scanning direction, in the form of lines having a width of 1-dot, 2-dot, and 4-dot at 1200 dpi, respectively. The solid images were recorded by ejecting the ink on the entire surface of an A5 size sample of U-LITE.

Image recording was carried out in the following manner. First, the blocking composition was ejected onto recording medium 20 from blocking composition ejection head 11 in a single pass mode, and the deposited blocking composition was dried by first dryer 14 over 10 seconds by blowing with a hot air at 120° C. at 5 m/sec while heating recoding medium 20 by heater 24 at 70° C. from the backside (opposite to the side on which the blocking composition has been deposited). Subsequently, the fixation composition was ejected from fixation composition ejection head 12 in a single pass mode, and the deposited fixation composition was dried by second dryer 15 over 15 seconds by blowing with a cold air at 25° C. at 5 m/sec. Thereafter, the cyan and magenta inks were ejected onto recording medium 20 in a single pass mode from the cyan and magenta ink ejection heads to record images, and the inks were dried by third dryer 16 for 5 seconds with a hot air at 120° C. at 5 m/sec while heating the backside of recording medium 20 by heater 26 at 50° C. After drying, the images were fixed by heat-pressing using heating roller 17 made of PFA (a completely fluorinated thermoplastic fluororesin, which is a copolymer of tetrafluoroethylene (TFE) and perfluoroalkoxyethylene) at 60° C. and a nip pressure of 1.0 mPa.

In Table 1, combination of the inks used for the image recording test and the Tg of resin particles (latexes) contained in the ink, fixation composition, and blocking composition are shown.

TABLE 1

|  | Aqueous ink | | Fixation composition | | Blocking composition | |
|---|---|---|---|---|---|---|
|  | Type | Tgi (° C.) | Type | Tgc (° C.) | Type | Tgb (° C.) |
| Example 1 | C1-1 | 49 | T-1 | 64 | B-1 | 38 |
| Example 2 | C1-2 | 9 | T-1 | 64 | B-1 | 38 |

TABLE 1-continued

|  | Aqueous ink | | Fixation composition | | Blocking composition | |
|---|---|---|---|---|---|---|
|  | Type | Tgi (° C.) | Type | Tgc (° C.) | Type | Tgb (° C.) |
| Example 3 | M1-1 | 49 | T-1 | 64 | B-1 | 38 |
| Example 4 | C2-1 | 49 | T-1 | 64 | B-2 | 98 |
| Comparative Example 1 | C1-1 | 49 | T-1 | 64 | None | — |
| Comparative Example 2 | C1-1 | 49 | T-2 | 20 | B-1 | 38 |
| Comparative Example 3 | C1-1 | 49 | T-3 | — | B-1 | 38 |

<<Image Evaluation>>

1. Image Quality (Delineation)

Delineation of the lines having a width of 1-dot, 2-dot, and 4-dot that have been recorded on the recording medium (U-LITE) in the above inkjet recording test were evaluated in accordance with the following criteria. The evaluation results are shown in Table 2.

<Evaluation Criteria>

1: All lines were uniformly recorded.

2: 1-dot line was uniformly recorded, but non-uniform line width, discontinuity, or formation of a solution puddle was partially observed in 2-dot and 4-dot lines.

3: 1-dot line was uniformly recorded, but non-uniform line width, discontinuity, or formation of a solution puddle was observed all over the 2-dot and 4-dot lines.

4: Non-uniform line width, discontinuity, or formation of a solution puddle was observed all over the 1-dot, 2-dot and 4-dot lines.

2. Curling

A sample (A5 size) with a solid image covering the entire surface thereof was placed on a horizontal plane. The height at the four corners (four peaks) of the sample that had been lifted up from the plane was measured and evaluated according to the following evaluation criteria. When the sample curled in a convex manner (the center of the recorded surface was lifted up from the plane), the paper was turned upside down so that the four corners are lifted up to conduct the measurement.

<Evaluation Criteria>

1: The arithmetic average height at four corners is less than 0.3 cm.

2: The arithmetic average height at four corners is 0.3 cm or more and less than 0.7 cm.

3: The arithmetic average height of four corners is 0.7 cm or more and less than 1.2 cm.

4: The arithmetic average height of four corners is 1.2 cm or more.

3. Abrasion Resistance

A sheet of U-LITE having no image thereon (hereinafter referred to as an unused sample) was overlaid on a solid image formed on the entire surface of a sample (A5 size), and the surface of unused sample was rubbed back and forth ten times under load of 150 kg/m². Thereafter, the unused sample and the solid image were visually observed, and evaluated according to the following evaluation criteria.

<Evaluation Criteria>

1: No color is adhered to the unused sample, and the solid image that has been rubbed is not deteriorated.

2: A color is adhered to the unused sample, but the solid image that has been rubbed is not deteriorated.

3: A color is adhered to the unused sample, and the solid image that has been rubbed is deteriorated.

4: The solid image that has been rubbed comes off to expose the surface of the sample (U-LITE).

TABLE 2

| | Aqueous ink | Fixation composition | Blocking composition | | Evaluation | | |
|---|---|---|---|---|---|---|---|
| | Tgi (° C.) | Tgc (° C.) | Tgb (° C.) | Tg relationship | Delineation | Abrasion resistance | Curling |
| Example 1 | 49 | 64 | 38 | Tgb < Tgi < Tgc | 1 | 1 | 1 |
| Example 2 | 9 | 64 | 38 | Tgi < Tgb < Tgc | 2 | 1 | 1 |
| Example 3 | 49 | 64 | 38 | Tgb < Tgi < Tgc | 1 | 1 | 1 |
| Example 4 | 49 | 64 | 98 | Tgi < Tgc < Tgb | 1 | 1 | 2 |
| Comparative Example 1 | 49 | 64 | — | Tgi < Tgc | 3 | 2 | 4 |
| Comparative Example 2 | 49 | 20 | 38 | Tgc < Tgb < Tgi | 4 | 3 | 1 |
| Comparative Example 3 | 49 | — | 38 | Tgb < Tgi | 2 | 4 | 1 |

As shown in Table 2, in the Examples of the invention, curling after image recording was suppressed and an image having high quality and high abrasion resistance was recorded. On the other hand, in the Comparative Examples, it was not possible to record an image having high image quality and high abrasion resistance while suppressing curling.

In view of the above, the invention provides an image recording method, an ink set, and an inkjet recording apparatus that enables recording of an image having less curling, high abrasion resistance and high reproducibility.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of recording an image by applying an aqueous ink by an inkjet method, comprising:
    forming a blocking layer on a recording medium, the blocking layer comprising a polymer component and being capable of blocking permeation of a solvent in the aqueous ink into the recording medium;
    forming a fixation layer on the blocking layer, the fixation layer comprising resin particles and a material that fixes a component in the aqueous ink; and
    recording an image by applying the aqueous ink onto the fixation layer by an inkjet method, the aqueous ink comprising a pigment, resin particles, water-soluble organic solvent and water,
    wherein the glass transition temperature of the polymer component in the blocking layer (Tgb), the glass transition temperature of the resin particles in the aqueous ink (Tgi) and the glass transition temperature of the resin particles in the fixation layer (Tgc) satisfy the relationship of Tgb<Tgi<Tgc.

2. The method according to claim 1, wherein Tgi and Tgc satisfy the relationship of $$15° C. \leq Tgi \leq Tgc.$$

3. The method according to claim 2, wherein Tgi and Tgc satisfy the relationship of 25° C.≦Tgi≦Tgc.

4. The method according to claim 1, wherein the material that fixes a component in the aqueous ink comprises an acid having a valency of two or more or a salt of a metal having a valency of two or more.

5. The method according to claim 1, further comprising drying or heating the blocking layer prior to forming of the fixation layer.

6. The method according to claim 1, wherein the blocking layer is formed by an inkjet method.

7. The method according to claim 6, wherein the blocking layer is formed in a selective manner at a portion on which the image is to be formed.

8. The method according to claim 1, further comprising fixing the image that has been recorded by applying at least one of pressure or heat to the image.

* * * * *